(12) United States Patent
Ha et al.

(10) Patent No.: US 11,752,972 B2
(45) Date of Patent: Sep. 12, 2023

(54) METHOD AND SYSTEM FOR SHARING PERSONAL MOBILITY

(71) Applicants: Hyundai Motor Company, Seoul (KR); Kia Motors Corporation, Seoul (KR); Ajou University Industry—Academic Cooperation Foundation, Gyeonggi-do (KR)

(72) Inventors: Jae Jun Ha, Gyeonggi-do (KR); Ilsoo Yun, Gyeonggi-do (KR); Sangmin Park, Chungcheongnam-do (KR); Sungho Park, Gyeonggi-do (KR); Harim Jeong, Gyeonggi-do (KR); Cheolwoo Kwon, Gyeonggi-do (KR); Jiwon Kim, Gyeonggi-do (KR); Kiyeon Park, Gyeonggi-do (KR)

(73) Assignees: Hyundai Motor Company, Seoul (KR); Kia Motors Corporation, Seoul (KR); Anjou University Industry-Academic Cooperation Foundation, Suwon (KR)

( * ) Notice: Subject to any disclaimer, the term of this patent is extended or adjusted under 35 U.S.C. 154(b) by 330 days.

(21) Appl. No.: 17/162,059

(22) Filed: Jan. 29, 2021

(65) Prior Publication Data
US 2021/0237685 A1    Aug. 5, 2021

(30) Foreign Application Priority Data
Jan. 30, 2020    (KR) .......................... 10-2020-0011141

(51) Int. Cl.
*B60R 25/24* (2013.01)
*H04W 4/029* (2018.01)
*H04W 4/44* (2018.01)
*G07C 5/00* (2006.01)
*G05D 1/02* (2020.01)
*B60R 25/25* (2013.01)
*G07C 5/04* (2006.01)
*B60K 31/00* (2006.01)

(52) U.S. Cl.
CPC ............ *B60R 25/24* (2013.01); *B60R 25/252* (2013.01); *B60R 25/255* (2013.01); *G05D 1/0276* (2013.01); *G07C 5/004* (2013.01); *G07C 5/008* (2013.01); *G07C 5/04* (2013.01); *H04W 4/029* (2018.02); *H04W 4/44* (2018.02); *B60K 31/00* (2013.01); *B60K 2031/0091* (2013.01)

(58) Field of Classification Search
CPC ..................................................... B60R 25/24
See application file for complete search history.

(56) References Cited

U.S. PATENT DOCUMENTS 9,876,788 B1 * 1/2018 Ziraknejad .............. G06F 21/34
11,444,933 B2 * 9/2022 Miu ....................... H04W 12/06

\* cited by examiner

*Primary Examiner* — Michael A Berns
(74) *Attorney, Agent, or Firm* — Fox Rothschild LLP

(57) ABSTRACT

A method of operating a personal mobility is provided. The method includes receiving, by a processor in the personal mobility, user identification information for a user authentication and transmitting the received user identification information to a server. A use approval message is received from the server when the user is a user registered in the server and the personal mobility is operated by the user according to the received use approval message.

19 Claims, 10 Drawing Sheets

METHOD AND SYSTEM FOR SHARING PERSONAL MOBILITY

CROSS-REFERENCE TO RELATED APPLICATION(S)

The present application claims priority to Korean Patent Application No. 10-2020-0011141, filed Jan. 30, 2020, the entire contents of which is incorporated herein for all purposes by this reference.

BACKGROUND

Field of the Disclosure

The present disclosure provides a method and system for sharing a personal mobility, and more particularly, to a method and system for using a personal mobility after setting a predetermined region in which the personal mobility may be utilized.

Description of the Related Art

As the miniaturization technology for products is recently being developed, mobilities are also being personalized and miniaturized. Recently, the need for providing personal mobilities in a reasonable price range is on the rise, and the technology for personal mobilities is being developed in various aspects. However, there may be legal and other constraints on using a personal mobility on a real road. Moreover, as a personal mobility may cause an accident on a normal road, it is necessary to control the use of personal mobility.

SUMMARY

The present disclosure provides a method and system for sharing a personal mobility. Additionally, the present disclosure provides a method and system for providing a region, where a personal mobility is shared, and for sharing the personal mobility based on the region. The present disclosure also provides a method and system for distinguishing a personal mobility type based on a using region.

According to one aspect of the present disclosure, a method of operating a personal mobility may be provided. The method may include: receiving, by a processor in the personal mobility, user identification information for a user authentication; transmitting the received user identification information to a server; receiving a use approval message from the server when the user is a user registered in the server; and operating the personal mobility by the user according to the received use approval message. Herein, the personal mobility is a mobility that travels for a predetermined time in a predetermined region. Additionally, use start and use end of the personal mobility are performed in the predetermined region.

According to another aspect of the present disclosure, a personal mobility may be provided. The personal mobility may include a transceiver configured to transmit and receive a signal; and a processor configured to operate the transceiver. The processor may be configured to: receive user identification information for user authentication of the personal mobility, determine whether a user is predetermined in a system or a server based on the received user identification information and, switch a control right of the personal mobility to the predetermined user when the user is a predetermined user. The personal mobility may be a mobility capable of traveling in the predetermined region for a predetermined time.

According to yet another aspect of the present disclosure, an operating system of a personal mobility may be provided. The system may include: the personal mobility configured to determine and provide location information and user identification information provided by a user; and an intelligent transportation system infrastructure configured to determine the user identification information and the location information provided by the personal mobility and adjust at least one of the driving region, driving time and driving speed of the personal mobility.

According to the present disclosure, a method and system for sharing a personal mobility may be provided. According to the present disclosure, a method and system for providing a region, where a personal mobility is shared, and for sharing the personal mobility based on the region. According to the present disclosure, a method and system for distinguishing a personal mobility type based on a using region may be provided.

The technical objects of the present disclosure are not limited to the above-mentioned technical objects, and other technical objects that are not mentioned will be clearly understood by those skilled in the art through the following descriptions.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
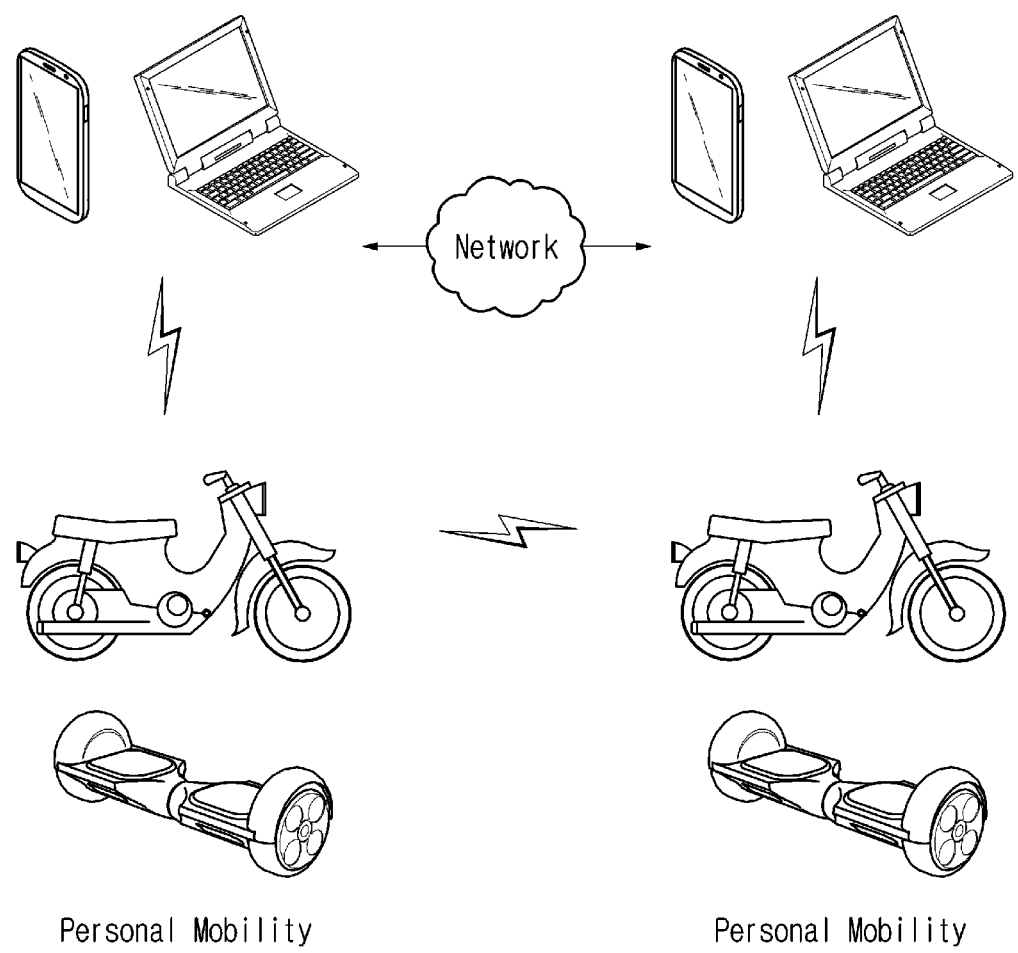
FIG. 1 is a view illustrating a method where a personal mobility communicates with another personal mobility or device through a network according to an exemplary embodiment of the present disclosure.

Hereinafter, exemplary embodiments of the present disclosure will be described in detail with reference to the accompanying drawings, which will be easily implemented by those skilled in the art. However, the present disclosure may be embodied in many different forms and is not limited to the embodiments described herein.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various exemplary embodiments are not necessarily essential components, and some may be optional components. Accordingly, exemplary embodiments consisting of a subset of the components described in one embodiment are also included within the scope of the present disclosure. Also, exemplary embodiments that include other components in addition to the components described in the various embodiments are also included in the scope of the present disclosure.

Advantages and features of the present disclosure, and methods for achieving them will be apparent with reference to the exemplary embodiments described below in detail with reference to the accompanying drawings. However, the present disclosure is not limited to the exemplary embodiments set forth herein but may be embodied in many different forms. The present exemplary embodiments are provided to make disclosed contents of the present disclosure thorough and complete and to completely convey the scope of the disclosure to those with ordinary skill in the art.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the present disclosure, "personal mobility" may refer to a personal means of transportation. Furthermore, "personal mobility" in the present disclosure may include a means of transportation capable of independently driving without a user's driving operation. For this, "personal mobility" may include a mobility including at least three wheels for stable independent driving or a mobility (e.g., a single-wheeled Segway®, a two-wheeled Segway®, an electric scooter, etc.) that has one or two wheels but may drive independently by keeping its balance. As an example, a personal mobility may mean a means of transportation that may be taken or used by only one user.

In addition, as an example, a personal mobility may mean a means of transportation that a small number of users may use as a small means of transportation. As an example, the description below will mainly focus on a means of transportation as a personalized means of transportation used by one user but is not limited thereto. As an example, a personal mobility may be a means of transportation so small as to be used by one user and to be carried by the user. In addition, as an example, a personal mobility may be a means of transportation of the same size as a cart and may be used by one or more users. As a more specific example, a personal mobility may be a means of transportation that is powered mainly by electricity and is used by one or two persons. As an example, not only a single-wheeled Segway®, a two-wheeled Segway® and an electric scooter but also an electric wheelchair, an electric bicycle and an electric two-wheeled vehicle may be a personal mobility. Although an exemplary embodiment of the present disclosure illustrates a wheel-based personal mobility, it does not limit the present disclosure and may be modified in various ways. For example, "personal mobility" may include a hoverboard and a personal air vehicle (PAV).

In an exemplary embodiment of the present disclosure, an intelligent transportation system infrastructure (ITSI) may include at least one traffic facility device provided on a course (e.g., road, road exclusively for two-wheeled vehicles, pedestrian, etc.) where a personal mobility travel. As an example, when the course on which a personal mobility travels is a road, the traffic facility device may include a road side unit (RSU). In addition, the traffic facility device provided on a road may function as an independent server. As another example, the traffic facility device may be connected to a server via a wired/wireless communication network and provide collected information to the server.

In response, the server may configure and provide ITS information using information or data provided by at least one traffic facility device. In addition, an ITSI may be configured to communicate with each personal mobility traveling on a course. Moreover, an ITSI may be any other apparatus provided on a road, is not limited to the above-described exemplary embodiment and may be variously altered. Although an exemplary embodiment of the present disclosure describes that a course on which a personal mobility travels is a road, the present disclosure is not limited to the exemplary embodiment. The course on which a personal mobility travels may be changed in various ways based on the type of a personal mobility, and a traffic facility or server may also be changed variously.

FIG. 1 is a view illustrating a method where a personal mobility communicates with another personal mobility or device via a network. Referring to FIG. 1, a personal mobility may be configured to communicate with another personal mobility or another device. Herein, as an example, the personal mobility may be configured to communicate with another personal mobility or another device based on cellular communication, WAVE communication, dedicated short range communication (DSRC), or other communication schemes. In other words, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

For example, with regard to communication of a personal mobility, for the security of a personal mobility, a communication module enabling only a device located inside the personal mobility to perform communication may be separated from a module enabling communicating with a device outside the personal mobility. For example, inside a personal mobility, communication based on the security may be performed only for a device within a certain range in the personal mobility, such as Wi-Fi communication. As an example, the personal mobility may include a communication module for performing communication with an external device. Additionally, the above-described module may be implemented as a single module. In other words, based on a single module, a personal mobility may be configured to communicate with another device, which is not limited to the above-described exemplary embodiment. In a personal mobility, communication may be embodied based on various methods and is not limited to the above-described exemplary embodiment.

Figure 2:
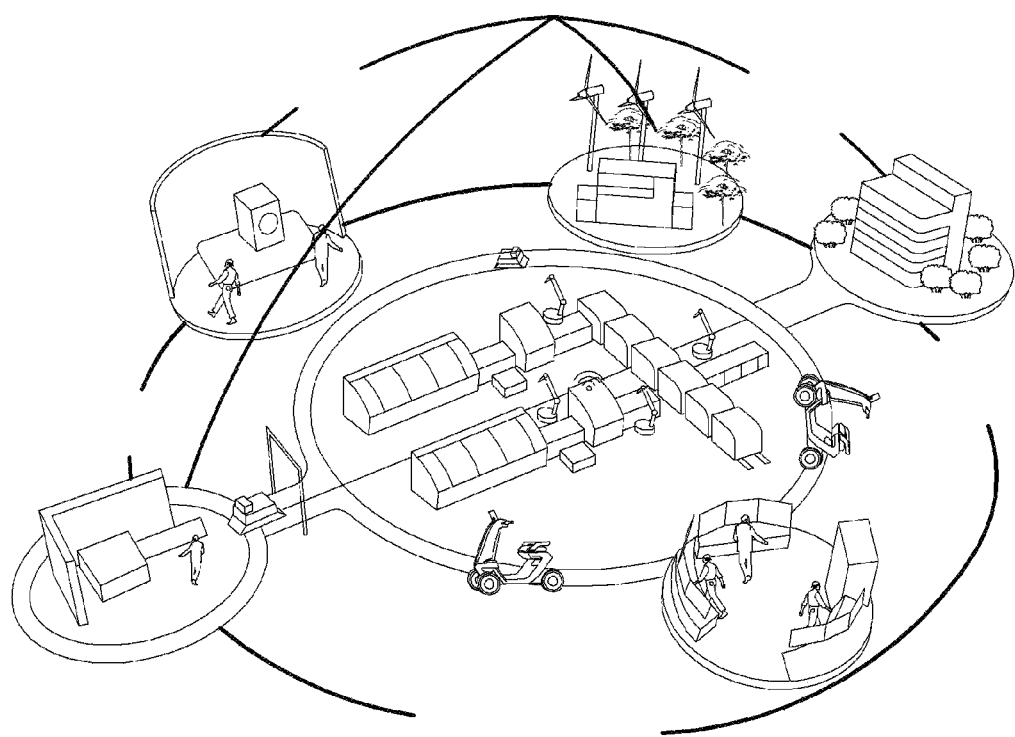
FIG. 2 is a view illustrating a method of using a personal mobility in a smart factory according to an exemplary embodiment of the present disclosure.

FIG. 2 is a view illustrating a method of using a personal mobility in a smart factory according to an exemplary embodiment of the present disclosure. Concerning the above-described personal mobility, the use of the personal mobility may be restricted on a legal basis. More specifically, the current road system may be divided into pedestrians and automobiles. Herein, a personal mobility may be suitable neither for the pedestrian space and for the automobile space. As an example, when a personal mobility is used in a pedestrian space, a collision between the personal mobility and a pedestrian may occur. Accordingly, there may be a legal restriction. In addition, as an example, when a personal mobility is used in an automobile space, there may be a legal restriction since the personal mobility driving at a low speed is likely to get in the way of running automobiles or to cause an accident.

In consideration of the above description, as the use of a personal mobility may be restricted, a method for utilizing a personal mobility may be necessary. Herein, as an example, the use of a personal mobility may be limited to a predetermined region. As an example, the predetermined region may be a smart factory or a large apartment complex. Referring to FIG. 2, a smart factory may be built on a region too large to walk. On the other hand, a vehicle may also be difficult to use in a smart factory in view of its relation to pedestrians. In consideration of the above description, a personal mobility may be set to be used in a specific region.

Figure 3:
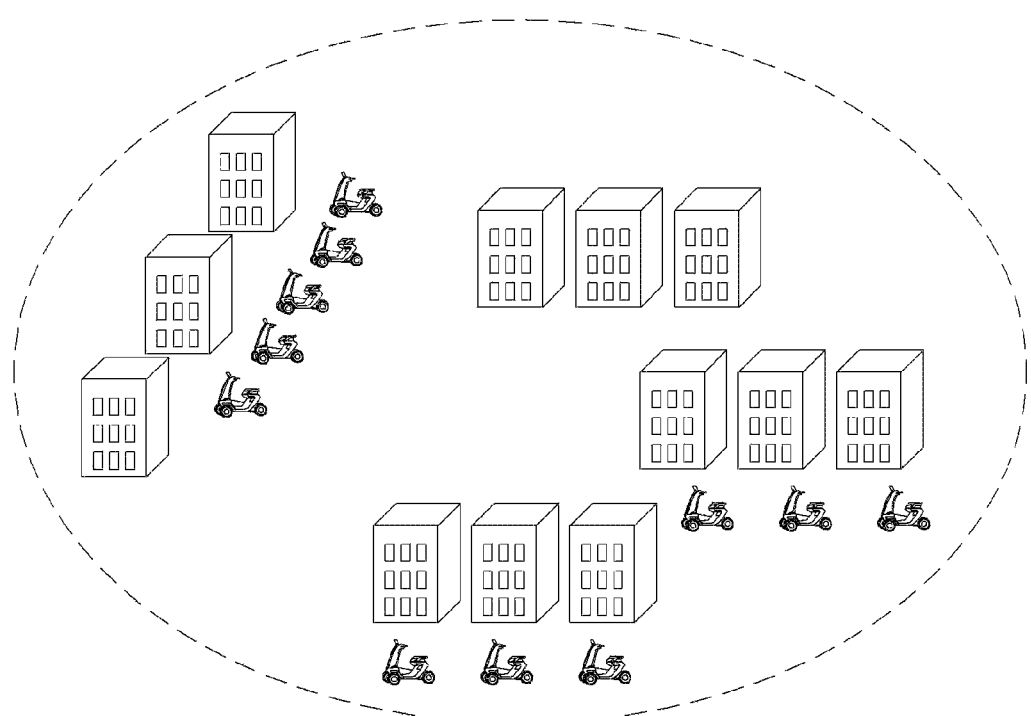
FIG. 3 is a view illustrating a method of using a personal mobility in a large apartment complex according to an exemplary embodiment of the present disclosure.

FIG. 3 is a view illustrating a method of using a personal mobility in a large apartment complex according to an exemplary embodiment of the present disclosure. As yet another example, referring to FIG. 3, a personal mobility may be used in an area such as an apartment complex. In the case of a large apartment complex, vehicle driving may be restricted with consideration to its relation to pedestrians and the risk of accident. As an example, in an apartment complex, vehicles may travel only underground and the use of a vehicle on the ground may be restricted. In consideration of the above description, a personal mobility may be set to be used in a specific region to the mobility of a pedestrian and a user. As an example, a system for making a personal mobility available in a specific region may be built up, which will be described below.

In addition, as an example, in the case of a personal mobility, to prevent a collision with a pedestrian or affecting the pedestrian movement, a personal mobility specification needs to be determined. As yet another example, when a personal mobility is indiscreetly used within a specific region, the movement of a pedestrian may be disturbed and thus a restriction may be required. In view of the above, hereinafter a method of sharing and using a personal mobility in a specific region and a method of setting a personal mobility will be described.

Figure 4:
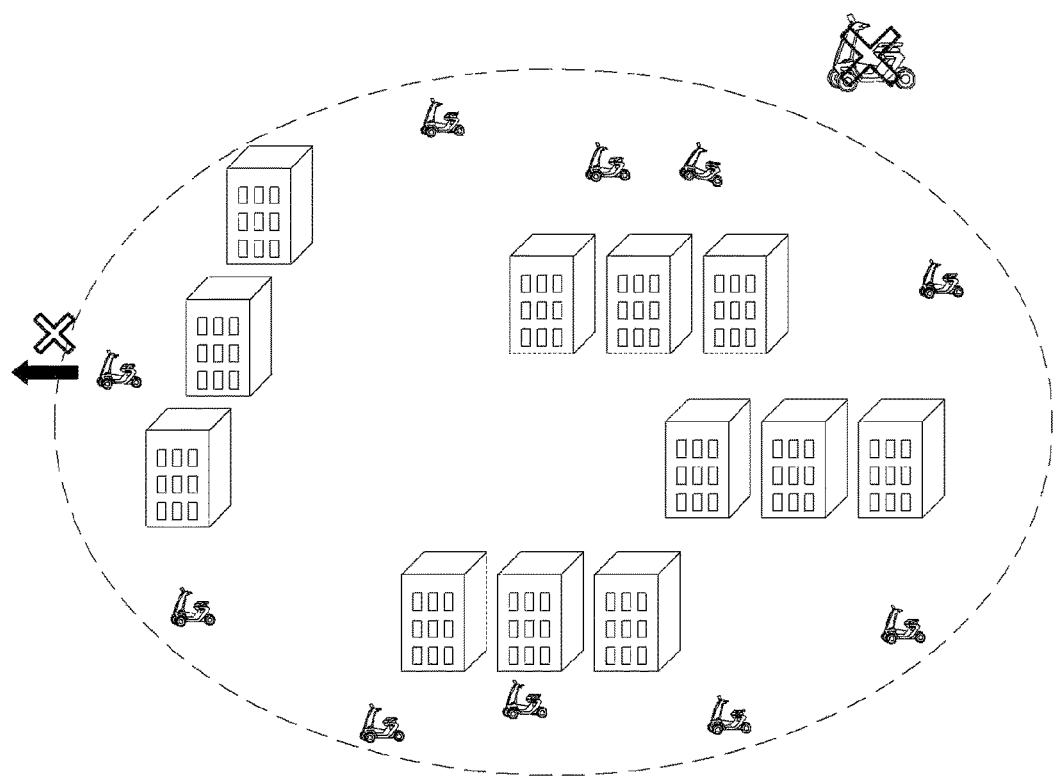
FIG. 4 is a view illustrating a method of sharing a personal mobility according to an embodiment of the present disclosure.

FIG. 4 is a view illustrating a method of sharing a personal mobility according to an exemplary embodiment of the present disclosure. As a more specific example, a personal mobility may be shared and used in a specific region. Herein, the specific region may refer to a large apartment complex or a smart factory, that is, a region in which a personal mobility may be used, but is not limited thereto. As an example, the personal mobility may be shared and operated by a system in a specific region. As an example, a system for using and managing a personal mobility may be built up in a large apartment complex, and the personal mobility may be operated based on a server for the system. In particular, the system may operate based on a server capable of communication within a specific region. The system may be configured to obtain location information for a personal mobility in a specific region and store information for the specific region in advance.

In other words, the system may be configured to operate a personal mobility by recognizing a specific region. The number of personal mobilities that are registered and used in the system may be limited. In particular, the number of personal mobilities available in a system may be set differently based on an area of a specific region. As an example, when a specific region increases, the number of personal mobilities available in a system may increase. On the other hand, when a specific region decreases, the number of personal mobilities available in a system may decrease. In other words, a system may be configured to set the number of available personal mobilities based on a specific region and determine the number of personal mobilities operated based thereon. As an example, through the above description, the way or path of a pedestrian within a specific region may not be obstructed.

In addition, as an example, a system may be configured to operate a personal mobility so that it may be used within a specific region. The personal mobility may be configured to transmit its location information to a system on a predetermined cycle. Herein, based on information received from a personal mobility, the system may be configured to operate the personal mobility so that it may be used within a specific region. As another example, a personal mobility may be configured to identify location information. The information on a specific region may be stored beforehand in the personal mobility, and the pre-stored information and the location information of the personal mobility may be compared. Thus, the personal mobility may be operate to not go outside a specific region.

As yet another example, a personal mobility may be shared by a system. More specifically, a personal mobility may be shared by predetermined users. A personal mobility may be shared by apartment residents in an apartment complex. Herein, as an example, the predetermined users may be users who are registered in a system. To make a personal mobility, which is available in an apartment complex, used by apartment residents, a system may be configured to register and manage the apartment residents. The system may provide an environment for registering apartment residents and may register community information (e.g., apartment block number, house number, etc.) and authentication information (e.g., personal password, etc.) of the apartment residents via the provided environment. Based on this, a personal mobility may be configured to perform authentication for a predetermined user through the system. In particular, authentication for a predetermined user may be performed using registered community information (e.g., apartment block number, house number, etc.) and authentication information (e.g., personal password). As another example, authentication for a predetermined user may be performed using a separate device (e.g., personal apartment key) for a personal mobility.

Although, in an exemplary embodiment of the present disclosure, a separate device (e.g., personal apartment key), community information (e.g., apartment block and house numbers, etc.) or authentication information (e.g., personal password) may be used to authenticate a predetermined user, the present disclosure does not limit it, and various means of authenticating a predetermined user may be used. For example, authentication of a predetermined user may use biometric information of a pre-registered user. As an example, a system may be configured to register and manage biometric information for a user. As an example, the biometric information may be fingerprint, iris and other personal information of the user but is not limited to the above-described embodiment.

As described above, a personal mobility may be configured to obtain information (e.g., information on a personal password) for authentication through an input device. Next, the personal mobility may be configured to transmit the received identification information to a system (or a server). Herein, the system (or server) may be configured to determine whether the identification information of the user matches the received identification information. Herein, when the identification information of a pre-registered user matches the received identification information, the system (or server) may be configured to transmit a use approval message to the personal mobility. The personal mobility may be configured to provide or switch control to the user based on the user approval message. Thus, the user may operate and use the personal mobility. In other words, the system (or server) may be configured to register a user who may use a personal mobility, provide identification information of the registered user to a personal mobility, and thus limit the use of a personal mobility within a specific region to a predetermined user.

Meanwhile, as yet another example, a personal mobility may be a means of transportation traveling at a predetermined speed and below. As an example, a personal mobility may be driven within a specific region and by considering a relation to a pedestrian. In view of what is described above, a system may be configured to set a maximum speed of a personal mobility to a predetermined speed or less. As an example, a predetermined speed may be about 20 km/h. Additionally, a system may be configured to set differently a predetermined speed based on a feature of a specific region. As a specific example, when a same personal mobility is used by being registered in a first system (e.g., a smart factory), a first speed (e.g., about 40 km/h) may be used as a maximum speed. On the other hand, when a personal same personal mobility is used by being registered in a second system (e.g., a large apartment), a second speed (e.g., about 20 km/h) may be used as a maximum speed.

Furthermore, a personal mobility, though being used in a same system, may be configured to adaptively limit a speed according to an environment set to a system. When a first system (e.g., a smart factory) is configured in an environment in which the density of mechanical devices or instruments is greater than a predetermined threshold, a maximum speed may be used by being set as a second speed (e.g., about 20 km/h). In an environment where the density of mechanical devices or instruments is set to be equal to or less than a predetermined threshold, a maximum speed may be used by being set as a first speed (e.g., about 40 km/h). In a second system (e.g., a large apartment), a region used by relatively many pedestrians (e.g., an entrance of apartment building, a gate of apartment complex, an adjoining area of playground, etc.) may have a relatively high risk of accident, while a region used by not many pedestrians may have a relatively low risk of accident. Accordingly, a personal mobility may be operated as its maximum speed is differently set for each region in a second system (e.g., a large apartment).

For example, the maximum speed of a personal mobility may be limited to a third speed (e.g., about 10 km/h) in a first region (e.g., an entrance of apartment building, a gate of apartment complex, an adjoining area of playground, etc.) and to a second speed (e.g., about 20 km/h) in a second region (e.g., a region used by not many pedestrians). Moreover, a personal mobility may be configured to limit speed temporarily based on whether there is an obstacle. For example, a personal mobility may be configured to check whether there is a pedestrian ahead and, if any, limit its speed to a fourth speed (e.g., about 5 km) or to the idling speed. Consequently, irrespective of a speed at which a personal mobility is capable of traveling, the maximum speed of the personal mobility may be adjusted by a system. As an example, the predetermined speed described above is merely one example, and the present disclosure is not limited to the above-described exemplary embodiment.

As yet another example, the use time of a personal mobility may be adjusted by a system. Since the personal mobility may be shared by a plurality of users, a limit on use time may be necessary. In addition, since the personal mobility may be used within a specific region, a limit on use time may not provide inconvenience to a user. Accordingly, a system may be configured to start counting use time as soon as a personal mobility starts being used and may limit use to a predetermined time and below. The system may be configured to limit the use of a personal mobility to about 30 minutes after the personal mobility detects a user. In other words, as a personal mobility may be used in a specific region, a system may be configured to prevent the personal mobility from being continuously used by a single user. Thus, the personal mobility may be efficiently used.

As another example, the use start point and use end point of a personal mobility may be limited. As an example, as described above, a personal mobility may be powered by electricity and operate based on a charging system. Accordingly, the use start point and use end point of a personal mobility may be limited to a specific point. Herein, in the case of a large apartment complex, a start point and an end point may be limited to an entrance of apartment, a front area of each building, and any other predetermined place. Meanwhile, as an example, a space for charging a personal mobility may be provided to a start point and an end point. Herein, the system may be configured to provide information on a charging place to a personal mobility. Thus, a user of a personal mobility may determine the use start point and end point of the personal mobility.

As another example, a system may control information of each user. As a specific example, the system may be configured to record information on a user who exceeds a use time or a user who does not end the use of a personal mobility in a predetermined space (e.g., penalty). In particular, the system may be configured to accumulate the information and generate a restriction on the use of a personal mobility for a particular user based on the information. As another example, the system may be configured to record other information on the use of a personal mobility. As a more specific example, the system may be configured to record information on the use of a personal mobility and provide an order of priority of use based on the information (e.g., mileage or priority). Additionally, the system may be configured to identify the number of personal mobilities in a charging space of a predetermined place.

Furthermore, the battery of a personal mobility may be discharged. Accordingly, the system may be configured to check the status of a battery in a personal mobility and manage the operation of the personal mobility by reflecting the status of the battery. For example, the system may be configured to receive an input of destination from a user, detect an anticipated amount of electric energy for traveling on a route to the destination, and determine and provide a personal mobility that is charged above the anticipated amount of electric energy. As another example, the system may be configured to check whether a personal mobility selected by a user is charged as much as an anticipated amount of electric energy. When the personal mobility is not charged as much as the anticipated amount of electric energy, the system may be configured to request the selected personal mobility to be charged. Furthermore, while a personal mobility is operating, it may consume more electric energy than an anticipated amount of electric energy.

Accordingly, a personal mobility may be configured to monitor a battery status during operation and provide the battery status to a user. As another example, a personal mobility may be configured to compare a monitored amount of electric energy and an anticipated amount of electric energy at every predetermined unit (e.g., hour, distance, etc.) and check whether it is possible to travel to a destination. In response to determining that it is impossible to travel to a destination, a personal mobility may be configured to adjust its operation in a mode (e.g., a power saving mode, an echo mode, etc.) consuming less power than a normal operation mode. Herein, the power saving mode may be an operation mode that minimizes the use of electronic devices (e.g., a monitor, a light, a communication module, etc.) provided internally or externally. In addition, the echo mode as an operation mode for minimizing the power consumption for operating a personal mobility may be an operation mode that adjusts a velocity, an acceleration and an instantaneous acceleration to minimize power required to drive the power unit (e.g., motor) of the personal mobility.

Meanwhile, in an exemplary embodiment of the present disclosure, a user moves by riding a personal mobility, but the present disclosure is not limited to the exemplary embodiment. As another example, according to use environment, a user may move by riding a personal mobility or by drawing the personal mobility. For example, a user may move by riding a personal mobility in a region where riding a personal mobility is allowed (e.g., road exclusive for bicycle) and may move by drawing the personal mobility in a region where riding a personal mobility is not allowed (e.g., playground). In addition, as another example, when a battery power level enables a personal mobility to travel to a destination, a user may move by riding the personal mobility. When a battery power level of a personal mobility is equal to or less a minimum threshold to travel to a destination, a user may move by drawing the personal mobility. As described above, a situation in which a user moves by drawing a personal mobility may occur. However, it may not be easy to draw the personal mobility because of its weight.

Accordingly, a personal mobility may be configured to operate in a riding mode or a travel mode. The riding mode or the travel mode may be selected by a user or be automatically set. For example, a personal mobility may be configured to check a region in which riding is allowed (e.g., road exclusive for bicycle) or a region in which riding is not allowed (e.g., playground) and set a riding mode or a travel mode according to a region thus identified. As another example, a personal mobility may be configured to set its operation mode basically to a riding mode, detect a battery power level at a predetermined time unit and, when the checked battery power level is equal to or less a minimum threshold for traveling to a destination, switch the operation mode to a travel mode. Furthermore, since a personal mobility is equipped with a driving unit like a driving motor for travel, the personal mobility may be configured to adjust a driving speed of the driving motor according to a riding mode or a travel mode. For example, a personal driving motor may be used as auxiliary power for moving a personal mobility in a travel mode. As the driving motor of a personal mobility is used as auxiliary power, a user may move the personal mobility with less power.

As an example, a system may be configured to manage mileage for a user using a personal mobility. For example, a system may be configured to calculate mileage based on the number of times, distance and duration in using a personal mobility. As another example, a system may be configured to calculate mileage by considering the rental place or return place of a personal mobility. Meanwhile, when the use of a personal mobility is concentrated during commuting hours, personal mobilities may be concentrated at the entrance of a large apartment. Accordingly, a system may be configured to allocate a personal mobility to a user with high priority based on the above-described mileage. Through the above-description, a system may prevent personal mobilities from being limited to a specific place. As another example, an unmanned move system of a personal mobility may be set up. Herein, as an example, a system may be configured to control the unmanned move of a personal mobility.

In particular, a system may be configured to control the move of a personal mobility to a predetermined place through unmanned move. As an example, a system may be configured to allocate personal mobilities early morning to a space, in which users may use the personal mobilities, through unmanned move. The personal mobility may be configured to store information on a predetermined place in advance. In addition, a guideline connecting predetermined places in a specific region may be provided. The guideline may be a guideline connecting only predetermined places and may not be provided in a different region. Herein, a personal mobility may be configured to recognize the guideline and move to a predetermined place in autonomous driving based on the recognized guideline.

For example, a personal mobility may be configured to transmit periodically an image taken forward to a server, and the server may be configured to analyze and update constantly information on the image. Preferably, a server may be configured to analyze information on a forward image through machine learning or AI analysis. Image analysis for a forward image may be performed in various ways of processing image analysis. Based on the above description, when a personal mobility travels along a guideline, whether the personal mobility deviates from the guideline may be determined. In other words, even when a personal mobility does not clearly detect a guideline through a bottom camera, the personal mobility may further be configured to determine whether it is traveling linearly or along the guideline by comparing a forward image stored already and a current image and thus may enhance driving reliability. As another example, a personal mobility may travel while recognizing a guideline using a bottom camera.

Herein, the personal mobility may have a guideline recognition error. The guideline recognition error may be a case in which the guideline is not identified over a predetermined ratio using a camera. As an example, it may be possible to consider a case in which it snows or rains or the guideline is not identified based on an obstacle at the bottom. When the recognition rate for the guideline is a predetermined value or less, a personal mobility may be configured to determine a guideline recognition error. When a personal mobility determines a guideline recognition error, it may request information for checking a path to a server. Herein, the server may be configured to provide a user device like a personal mobility or a mobile phone path with determination information obtained through machine learning based on image information obtained periodically from the personal mobility and other information.

As an example, as described above, as a personal mobility travels on a predetermined path, image information recognized by the personal mobility may be repeated, and the path may be determined based on this. Next, the personal mobility may travel along a guideline based on image information obtained from a server. Herein, the personal mobility may be configured to continuously recognize the guideline using a bottom camera and travel along the guideline again when the recognition rate of the guideline is equal to or greater than a predetermined rate.

In addition, a personal mobility may be configured to transmit periodically obtained image information to the server since then. Meanwhile, as an example, when a personal mobility is incapable of determining image information or a guideline is impossible to recognize even based on the above description, the operation of the personal mobility may be stopped and an error message may be transmitted to a server. Based on the above description, a personal mobility may be set to travel within a predetermined region while being equipped only with a camera. Thus, a low-cost personal mobility may be operated.

As another example, a method of improving the recognition rate for a guideline is worthy of consideration. As an example, the recognition rate may be improved through a lamp or a light emitting unit in a personal mobility. More specifically, as the guideline is located below the personal mobility, light may be blocked out, thereby decreasing the recognition rate of the guideline. Accordingly, there may be a lamp or a light emitting unit capable of casting a light on the guideline. As another example, a personal mobility may further include a display and further detect whether it is moving along a guideline through a map application. As an example, a personal mobility may be configured to display a map application. Herein, information on a guideline may be shared beforehand.

In addition, a guideline may be provided complexly or in various paths. As another example, it may not be easy to install a display because of the structure or structural feature of a personal mobility. In addition, even when a personal mobility is equipped with a display, the user of the personal mobility may have difficulty detecting the display. Accordingly, a personal mobility may be configured to output guidance information through an audio output unit like speaker. Herein, the guidance information may include information indicating a travel direction of the personal mobility. As another example, a personal mobility may include and use a haptic providing module using vibrations and may be configured to output guidance information by using the haptic providing module. For example, a personal mobility may be equipped with a bar-shaped handle like an electric scooter, an electric wheelchair, an electric bicycle and an electric two-wheeled vehicle and may be configured to enable a user to grasp both ends of the handle with hands. Based on this, a haptic providing module may be configured to provide a haptic effect to respective ends of the handle. Herein, the haptic providing module may be configured to provide a haptic effect to an end of handle according to a travel direction in which a personal mobility is to move.

Although an exemplary embodiment of the present disclosure illustrates that a personal mobility is moved along a guideline to move it to a predetermined place, the present disclosure is not limited thereto and the exemplary embodiment may be modified in various ways. As another example, a personal mobility may move to a predetermined place without a guideline under the control of a system. For example, a personal mobility may be configured to provide location information to a server device every predetermined time (e.g., about 10 seconds), and the server device may be configured to operate the personal mobility by providing a waypoint, at which the personal mobility is to arrive, every predetermined time (e.g., about 10 seconds), to the personal mobility so that the personal mobility may move to a predetermined place. As another example, the move of a personal mobility may be adjusted by complexly applying a guideline-based move and a system-based control. For example, a personal mobility may travel through the recognition of a guideline and, when an error occurs in the recognition of the guideline, may provide location information to a server device every predetermined time (e.g., about 10 seconds). In addition, the server device may be configured to operate the personal mobility by providing a waypoint, at which the personal mobility is to arrive, every predetermined time (e.g., about 10 seconds), to the personal mobility so that the personal mobility may move to a predetermined place.

Figure 5A:
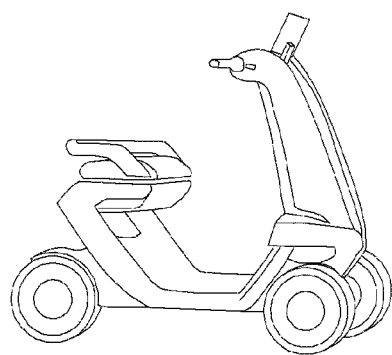
FIGS. 5A-5B are views illustrating a method of distinguishing types of personal mobilities according to an exemplary embodiment of the present disclosure.
Figure 5B:
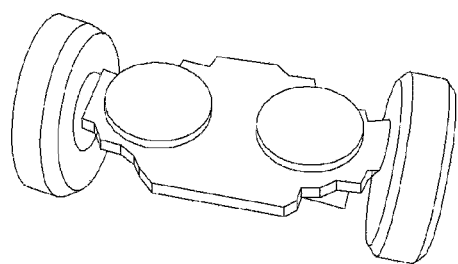

FIGS. 5A-5B are views illustrating a method of distinguishing types of personal mobilities according to an embodiment of the present disclosure. As described above, a personal mobility may be a small transportation means as a personal transportation means used by a single person. In addition, as an example, a personal mobility may be a transportation means used by one or more persons. As an example, FIG. 5A and FIG. 5B may be exemplary embodiments of personal mobilities but are not limited thereto. Herein, as an example, a system may set a permitted type of personal mobility based on information on a specific region.

As an example, when the specific region is a smart factory, the system may be configured to set personal mobilities holding a single person or two or more persons as the type of allowable personal mobility. On the other hand, when the specific region is a large apartment, the system may be configured to limit the type of personal mobility to a Segway® or a smaller single-person personal mobility. As an example, the system may be configured to store information on a type of personal mobility in advance and set a type of personal mobility allowed in a specific region based on the pre-stored information of the type of personal mobility. However, the present disclosure is not limited to the above-described embodiment.

Figure 6:
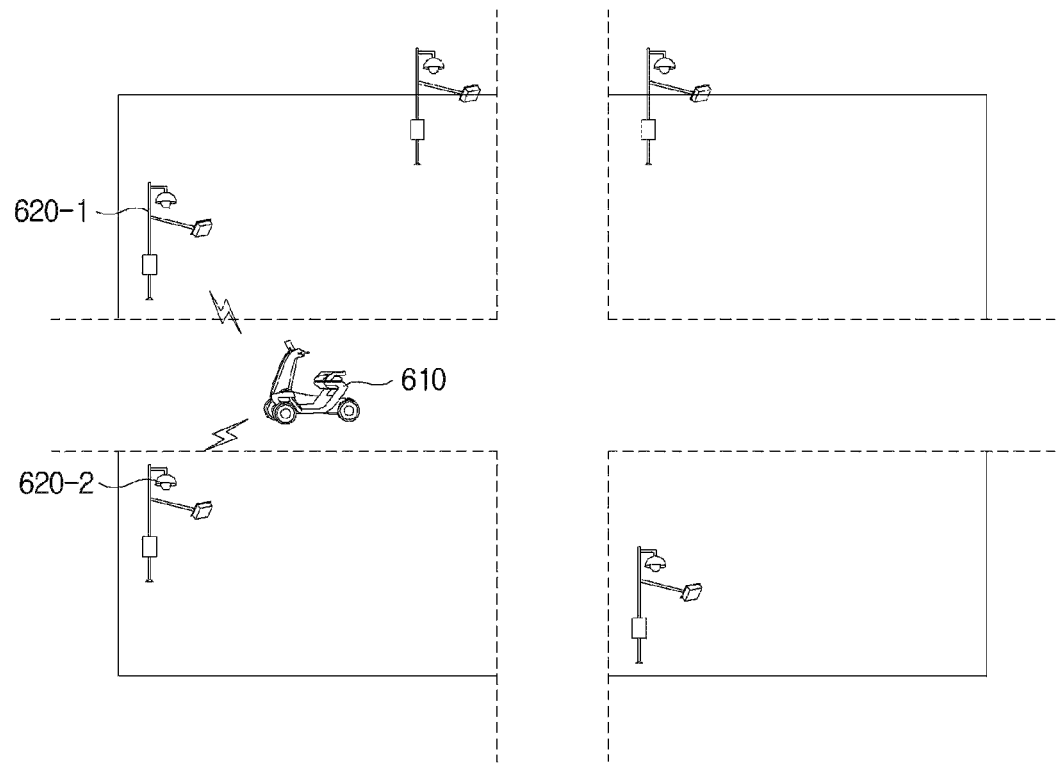
FIG. 6 is a view illustrating a method of driving a personal mobility according to an exemplary embodiment of the present disclosure.

FIG. 6 is a view illustrating a method of driving a personal mobility according to an exemplary embodiment of the present disclosure. Referring to FIG. 6, an infrastructure may be built up in order to control a personal mobility in a system. As an example, a personal mobility 610 may be capable of communicating with other devices. Herein, as an example, infrastructures 620-1 and 620-2 provided in a specific region may be configured to communicate with the personal mobility 610. As an example, the infrastructures 620-1 and 620-2 provided in a specific region may be street lights or road side units (RSUs). In addition, the infrastructures 620-1 and 620-2 may be configured to communicate with each other. In addition, a server may be configured to communicate with each of the infrastructures 620-1 and 620-2 but is not limited to the above-embodiment.

The personal mobility 610 may be configured to communicate with the infrastructures 620-1 and 620-2 adjacent to the personal mobility 610. As an example, the personal mobility 610 may be configured to deliver the location information and driving information of the personal mobility 610 via communication. Herein, the infrastructures 620-1 and 620-2 may be configured to transmit information received from the personal mobility 610 to a server. Through the above description, the personal mobility 610 may include only a local area network in which it may communicate with the infrastructures 620-1 and 620-2, and actual control may be performed through the infrastructures 620-1 and 620-2. As another example, the personal mobility 610 may be configured to communicate directly with a server. As an example, since a specific region may be a limited region, the personal mobility 610 may be configured to transmit relevant information to a server via direct communication with the server without using an infrastructure and may be operated based on this.

Figure 7:
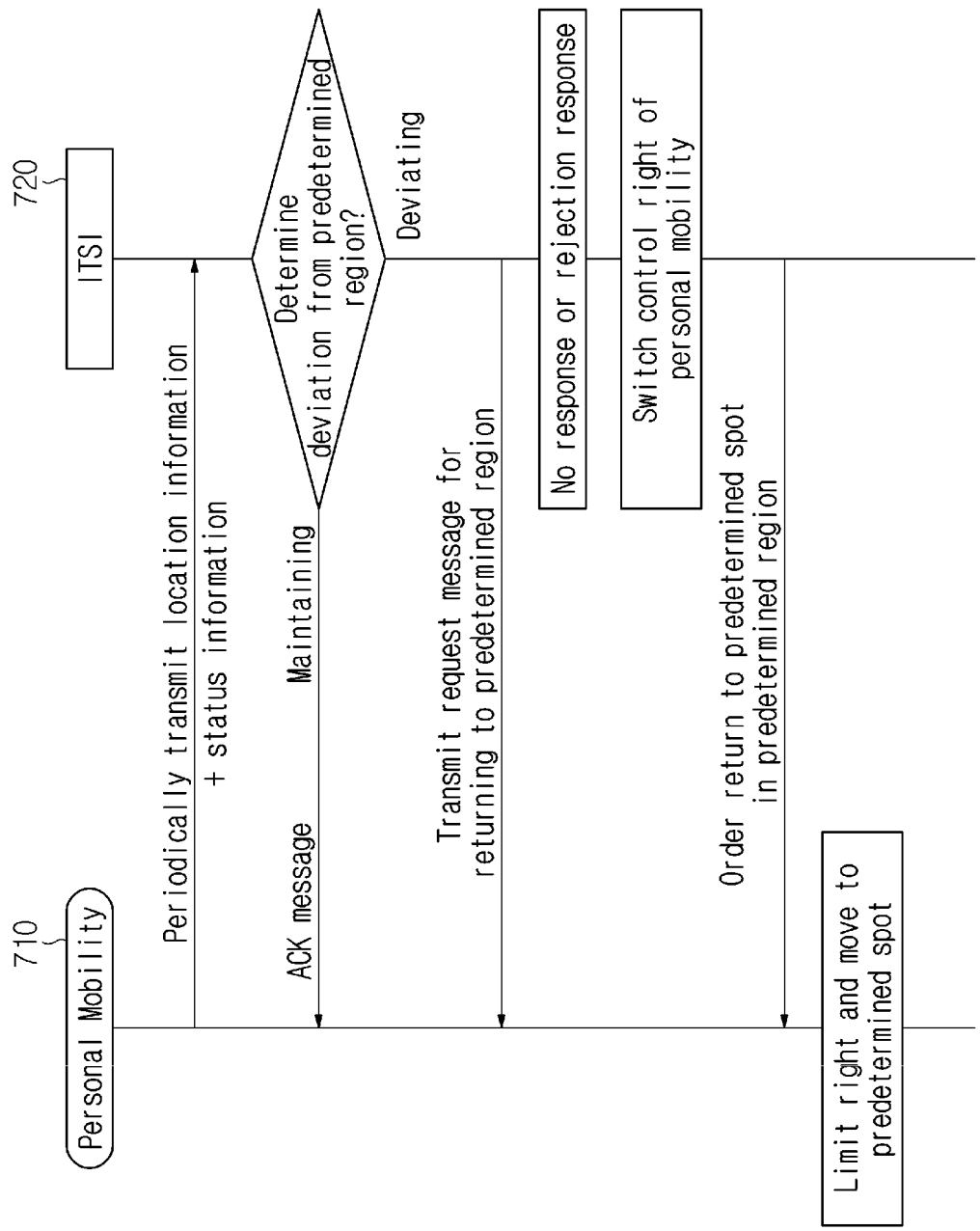
FIG. 7 is a flowchart for driving a personal mobility according to an exemplary embodiment of the present disclosure.

FIG. 7 is a flowchart for driving a personal mobility according to an exemplary embodiment of the present disclosure. As another example, through the above-described traffic infrastructures, it may be determined whether a personal mobility deviates a specific region. As a more specific example, referring to FIG. 7, a personal mobility 710 may be configured to transmit periodically location information to an ITSI 720. Herein, as an example, the personal mobility 710 may be configured to transmit location information and its status information to the ITSI 720. As an example, status information may be at least one or more of the information for distance to empty, battery-related information, current use time information, remaining use time information and current user information of the personal mobility 710, but is not limited to the above-described exemplary embodiment. Herein, the battery-related information may include at least one of the charge/discharge information of battery and replacement (or charge) notification information for notifying the request of replacement (or charge) of battery.

In addition, the charge/discharge information of battery may include information indicating the state of charge (SOC) of battery. The personal mobility 710 or the ITSI 720 may make SOC-based estimations on whether a battery is charged or discharged, whether the battery is to be charged, and battery availability time. In addition, as an example, as described above, the personal mobility 710 may be configured to transmit location information and status information to the ITSI 720 only when it is used by a user. That is, when the personal mobility 710 is not used, no information may be transmitted. Herein, the ITSI 720 may be configured to determine whether the personal mobility 710 deviates from a predetermined region based on information received from the personal mobility 710. In other words, it may be determined whether the personal mobility 710 is located outside the specific region described above. Herein, when the personal mobility 710 is located within the specific region, the ITSI 720 may be configured to transmit a determination message to the personal mobility 710. As another example, the ITSI 720 may be configured to transmit information, which determines that the personal mobility is located within a specific region, to a server.

As another example, the personal mobility 710 may be configured to transmit location information to the ITSI 720 based on event triggering. Herein, as an example, an event may be an accident that occurs to the personal mobility 710. In addition, as an example, an event may be a change of status in the personal mobility 710. In other words, when an abnormality occurs to the personal mobility 710 while a user uses the personal mobility 710, the personal mobility 710 may be configured to transmit immediately location information to the ITSI 720 even before a next cycle of transmitting location information. Thus, the ITSI (or server) may be configured to determine whether the personal mobility 710 is normally used and may implement a measure based on the location information of the personal mobility 710 when an abnormality occurs. As an example, when an accident occurs to the personal mobility 710, the ITSI (or server) may be configured to transmit location information of the personal mobility 710 to another organization or another server (e.g., 911) and may take a measure based on that.

Although, in an exemplary embodiment of the present disclosure, the ITSI (or server) is illustrated to transmit location information to another organization or another server (e.g., 911) and to take a measure based on that, the present disclosure does not limit the exemplary embodiment, which may be modified in various ways. For example, the personal mobility 710 may be configured to identify whether the personal mobility 710 collides or an impact amount using a sensor (e.g., acceleration sensor) provided therein and may be configured to determine whether there is an accident based on the identified result. In addition, when an accident occurs, information on whether the accident occurs may be transmitted together with location information. Furthermore, the personal mobility 710 may be configured to determine whether an ITSI responds and, when no response is received from the ITSI, transmit location information to an accident handling server (e.g., 911) for managing accident handling.

In addition, as an example, when the personal mobility 710 deviates a predetermined region, the ITSI 720 may be configured to deliver a request of returning to the predetermined region to the personal mobility 710. In other words, the ITSI 720 may be configured to determine whether the personal mobility 710 is located within a specific region. When the personal mobility 710 returns to the specific region after determining the message of the ITSI 720, the personal mobility 710 may be continuously used. On the other hand, as when the ITSI 720 does not receive a response from the personal mobility 710 or receives a response for indicating return rejection, the ITSI 720 may be configured to switch the control right of the personal mobility 710. As an example, the ITSI 720 may be configured to transmit a request for switching the control right of the personal mobility 710 to a server and switch the control right of the personal mobility 710 based on the server. For example, the ITSI 720 may be configured to transmit a control right switch request message for requesting the control right switch of the personal mobility 710 to a server device controlling the control right of the personal mobility 710, and the server device may be configured to transmit a control right switch processing message for processing the control right switch of the personal mobility 710 to the personal mobility 710.

Accordingly, when receiving the control right switch processing message, the personal mobility 710 may be configured to switch control right of the personal mobility 710. Herein, the control right switch processing message may include a command for returning the personal mobility 710 to a predetermined spot in a predetermined region. Herein, as the control right of the personal mobility 710 is switched, the personal mobility 710 may move to the predetermined spot in autonomous driving based on a system.

As another example, the personal mobility 710 may be configured to store information on a predetermined region in advance. When the personal mobility 710 deviates from the predetermined region because of a user, the personal mobility 710 may limit the use of the personal mobility 710 at the time when it deviates from the region based on its location information and the pre-stored information. In other words, the personal mobility 710 may be configured to recognize the predetermined region and not to travel out of the region. Thus, the use of the personal mobility 710 may be limited.

Figure 8:
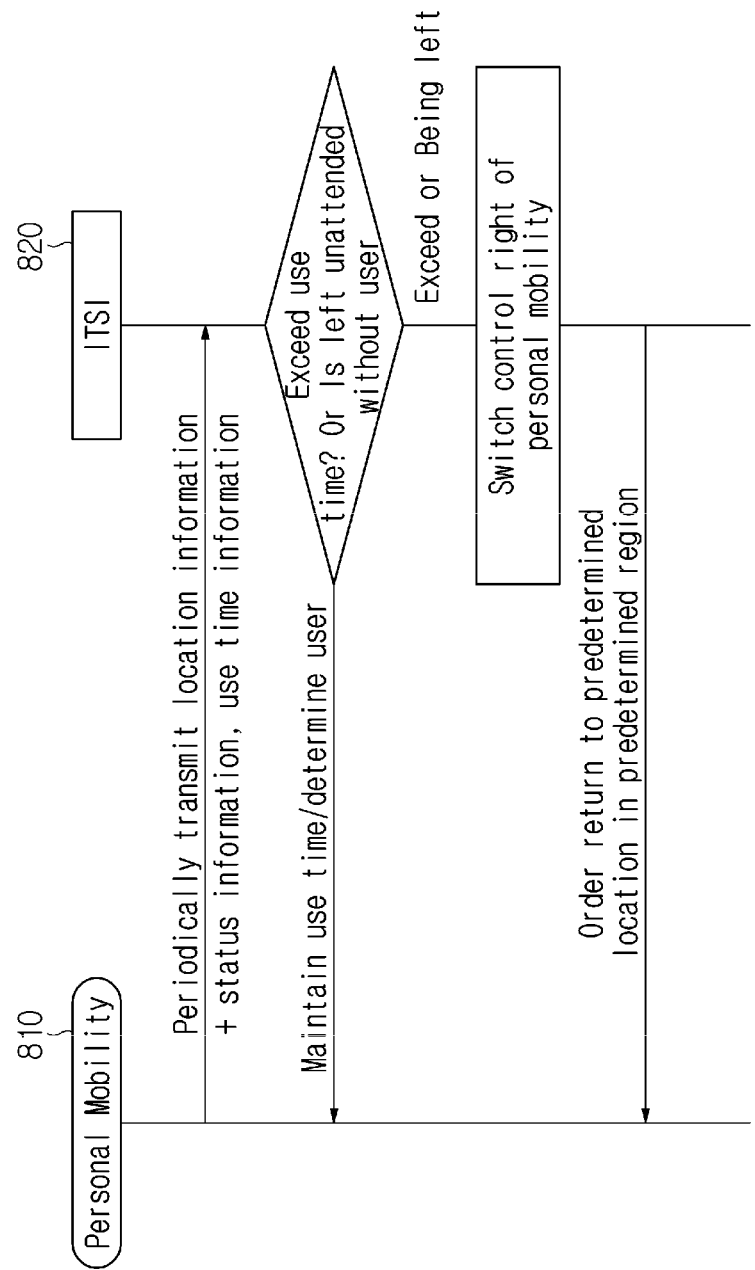
FIG. 8 is a flowchart for driving a personal mobility according to an exemplary embodiment of the present disclosure.

FIG. 8 is a flowchart for driving a personal mobility according to an exemplary embodiment of the present disclosure. Referring to FIG. 8, as described above, a personal mobility 810 may be configured to transmit location information and status information to an ITSI 820. Herein, as an example, as described above, the status information may include information on user's use time as user information. As an example, as the personal mobility 810 may be used based on sharing in a specific region, the personal mobility 810 may have a limitation on use time and operate based on the limitation. Herein, the ITSI 820 may be configured to determine whether use time terminates or the personal mobility is left unattended without user. More specifically, when the personal mobility 810 is not used, the personal mobility 810 may not transmit the above-described location information and status information to the ITSI 820.

On the other hand, when the personal mobility 810 is used by a user, the personal mobility 810 may be configured to transmit location information and information on a user to the ITSI 820. Herein, ITSI may be configured to determine whether the personal mobility 810 exceeds use time or is left unattended without user based on the received information. As an example, the personal mobility 810 may be configured to sense a user who is using it and transmit sensed information to the ITSI 820. As an example, the ITSI 820 may be configured to determine whether the personal mobility 810 is left unattended based on information that is sensed by the personal mobility 810. Next, the ITSI 820 may be configured to switch the control right of the personal mobility 810.

The ITSI 820 may be configured to transmit a request for switching the control right of the personal mobility 810 to a server and switch the control right of the personal mobility 810 based on the server. Herein, the ITSI 820 may be configured to deliver a command to return to a predetermined spot in a predetermined region to the personal mobility 810. Herein, as the control right of the personal mobility 810 is switched, the personal mobility 810 may move to the predetermined spot in autonomous driving based on a system.

Figure 9:
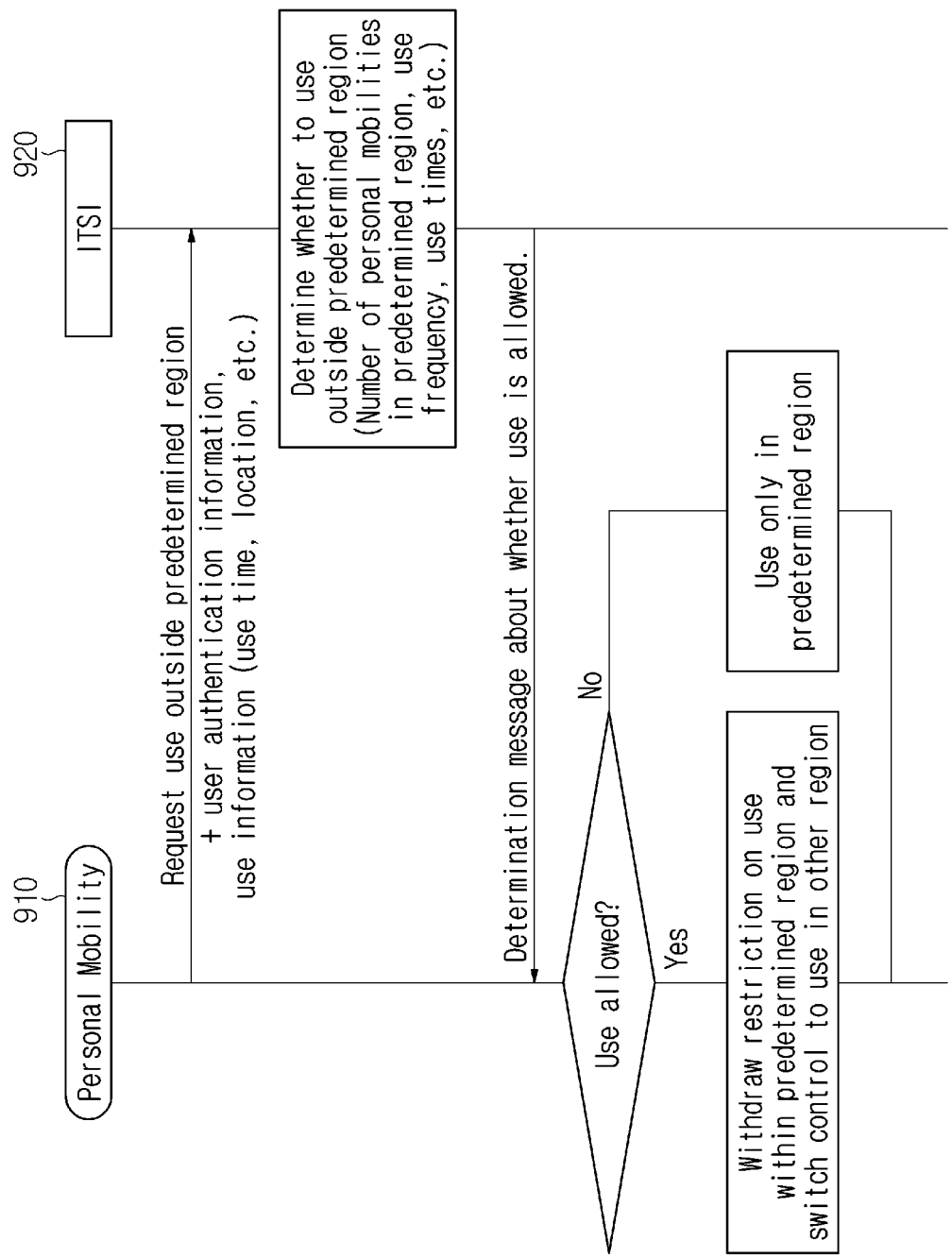
FIG. 9 is a flowchart for driving a personal mobility according to an exemplary embodiment of the present disclosure.

FIG. 9 is a flowchart for driving a personal mobility according to an exemplary embodiment of the present disclosure. Referring to FIG. 9, a personal mobility 910 may be used outside a predetermined region. Herein, as an example, when a user intends to use the personal mobility 910 outside the predetermined region, the user may transmit information on a request for use outside the predetermined region to an ITSI 920 through the personal mobility 910. The ITSI 920 may be configured to transmit the corresponding information to a server, and the server may be configured to determine whether to use. In particular, an ITSI (or server) may be configured to determine whether to use a region other than a predetermined region by using at least any one piece of information among the number of personal mobilities within the specific region, the use frequency of the personal mobilities, and times of using the personal mobilities.

Additionally, an ITSI (or server) may not allow the use of a personal mobility outside a predetermined region in a time with a high use frequency of the personal mobility. In addition, as an example, an ITSI (or server) may not allow the use of a personal mobility when the number of personal mobilities used outside a predetermined region exceeds a reference value. In other words, an ITSI (or server) may be configured to limit the number of personal mobilities available outside a predetermined region. Based on the above description, an ITSI may be configured to transmit a response regarding whether it may be used outside a predetermined region to the personal mobility 910. Herein, when it may be used outside the predetermined region, the personal mobility 910 may be configured to withdraw a restriction on its being used within the predetermined region and may be used in a region other than the predetermined region.

However, as an example, the ITSI (or server) may be configured to deliver information on the restriction on its being used outside the predetermined region to the personal mobility 910. As an example, the use time for the personal mobility 910 outside a predetermined region may be limited. In addition, as an example, additional user authentication may be performed to use the personal mobility 910 outside a predetermined region. In addition, as an example, charging may set to use the personal mobility 910 outside the predetermined region, and the present disclosure is not limited to the above-described exemplary embodiment. On the other hand, when it is impossible to use the personal mobility 910 outside a predetermined region, the personal mobility 910 may be used only within the predetermined region, and details may be same as described above.

Figure 10:
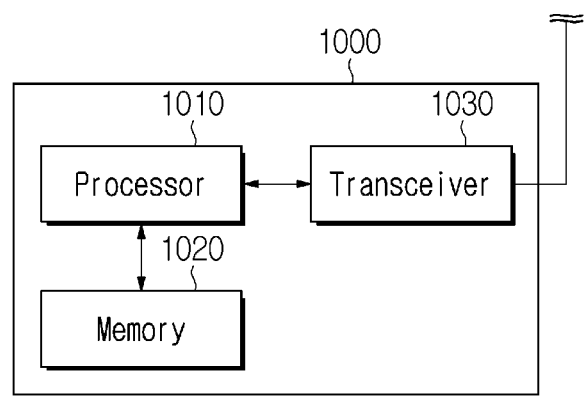
FIG. 10 is a view illustrating an apparatus configuration according to an exemplary embodiment of the present disclosure.

FIG. 10 is a view illustrating an apparatus configuration according to an exemplary embodiment of the present disclosure. Referring to FIG. 10, the apparatus may include at least one of the above-described personal mobility, a moving object, a device, a server and an RSU. In other words, the apparatus may be configured to communicate and work with another device. The present disclosure is not limited to the above-described embodiment. For example, for the above-described operation, an apparatus 1000 may include one or more among a processor 1010, a memory 1020, and a transceiver 1030. In other words, the apparatus may include a necessary configuration for communicating with another apparatus. In addition, the apparatus may include another configuration apart from the above-described configuration. In other words, the apparatus may have a configuration, which includes the above-described apparatus for communicating with another device but is not limited thereto, and may be operated based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various exemplary embodiments of the disclosure are not intended to be all-inclusive and are intended to illustrate representative aspects of the disclosure, and the features described in the various exemplary embodiments may be applied independently or in a combination of two or more. In addition, the various exemplary embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays. A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various exemplary embodiments to be performed on a device or computer, and a non-transitory computer-readable medium in which such software or instructions are stored and are executable on a device or computer.

What is claimed is:

1. A method of operating a personal mobility, comprising:
    receiving, by a processor of the personal mobility, user identification information for a user authentication of a user;
    transmitting, by the processor, the received user identification information to a server;
    receiving, by the processor, a use approval message from the server in response to determining that the user is registered in the server; and
    operating the personal mobility by the user according to the received use approval message;
    wherein the personal mobility is a mobility capable of traveling in a predetermined region;
    wherein the personal mobility is a mobility capable of driving at a speed slower than a predetermined speed on the basis of at least one of a feature of the predetermined region or a status of a battery in the personal mobility, in order to ensure normal operation of the personal mobility.

2. The method of claim 1, wherein the processor is configured to periodically transmit location information of the personal mobility to the server when the personal mobility is operating by the user.

3. The method of claim 2, wherein the processor is configured to transmit the location information of the personal mobility and status information of the personal mobility to the server.

4. The method of claim 3, wherein the status information includes at least one of information for a distance to empty, a battery-related information, a current use time information, a remaining use time information and a current user information of the personal mobility.

5. The method of claim 2, wherein when an event occurs to the personal mobility, the processor is configured to transmit the location information of the personal mobility immediately to the server based on the event.

6. The method of claim 5, wherein the event is detected by the personal mobility, when an abnormality occurs to status information of the personal mobility.

7. The method of claim 6, wherein the processor is configured to determine an event for an accident occurrence based on whether a collision occurs or based on a sensed amount of impact and notify information on the accident occurrence to an intelligent transportation system infrastructure.

8. The method of claim 7, wherein in response to determining reception of a response message corresponding to transmission of the response message, the information on the accident occurrence is provided to at least one accident handling server in response to whether the response message is received.

9. The method of claim 1, wherein the personal mobility is a mobility capable of driving within the predetermined region, for a predetermined time.

10. The method of claim 9, wherein the personal mobility is charged in the predetermined region.

11. The method of claim 9, wherein a guideline for moving the personal mobility is provided between a plurality of the predetermined region, and wherein the personal mobility moves along the guideline in an autonomous driving mode between the plurality of the predetermined region based on a control of the server.

12. The method of claim 1, wherein, the processor is configured to transmit a request message for use outside the predetermined region to the server when the personal mobility is used outside the predetermined region by the user, and wherein the server is configured to determine whether the use outside the predetermined region is possible and transmit a response message to the personal mobility.

13. The method of claim 12, wherein the server is configured to determine whether the use outside the predetermined region is possible based on at least one of the number of personal mobilities within the predetermined region, use times, and use frequency information.

14. The method of claim 1, wherein the user identification information include at least one of fingerprint information, iris information, and password information.

15. An apparatus for a personal mobility, comprising:
a transceiver configured to transmit and receive a signal; and
a processor configured to operate the transceiver, wherein the processor is configured to:
receive user identification information for user authentication of the personal mobility,
determine whether a user is predetermined in a system or a server based on the received user identification information and,
switch a control right of the personal mobility a predetermined user in response to determining that the user is the predetermined user, and
wherein the personal mobility is a mobility capable of traveling in a predetermined region and for a predetermined time; and
wherein the personal mobility is a mobility capable of driving at a speed slower than a predetermined speed on the basis of at least one of a feature of the predetermined region or a status of a battery in the personal mobility, in order to ensure normal operation of the personal mobility.

16. The apparatus of claim 15, wherein use start and use end of the personal mobility are performed in the predetermined region.

17. The apparatus of claim 16, wherein the personal mobility is charged in the predetermined region.

18. The apparatus of claim 17, wherein a guideline for moving the personal mobility is provided between a plurality of the predetermined region, and wherein the personal mobility moves along the guideline in an autonomous driving mode between the plurality of the predetermined region based on control of the server.

19. The apparatus of claim 15, wherein the processor is configured to:
request a non-predetermined region use request message for requesting use of the personal mobility outside the predetermined region to the system or server,
receive a response message including information indicating whether use in a non-predetermined region is possible from the system or server, and
control the use of the personal mobility outside the predetermined region based on the information included in the response message.

* * * * *